(12) United States Patent
Carcano et al.

(10) Patent No.: US 10,750,581 B2
(45) Date of Patent: Aug. 18, 2020

(54) APPARATUS AND SYSTEM FOR FAULT PROTECTION OF POWER AMPLIFIER IN SOLID STATE RF OVEN ELECTRONICS

(71) Applicant: ILLINOIS TOOL WORKS INC., Glenview, IL (US)

(72) Inventors: Marco Carcano, Senago (IT); Michele Gentile, Jesi (IT); Michele Sclocchi, San Donato Milanese (IT)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 333 days.

(21) Appl. No.: 15/811,013

(22) Filed: Nov. 13, 2017

(65) Prior Publication Data
US 2018/0153000 A1     May 31, 2018

Related U.S. Application Data

(60) Provisional application No. 62/427,924, filed on Nov. 30, 2016.

(51) Int. Cl.
*H05B 6/68* (2006.01)
*H05B 6/64* (2006.01)

(52) U.S. Cl.
CPC .............. *H05B 6/68* (2013.01); *H05B 6/642* (2013.01); *H05B 6/645* (2013.01); *H05B 6/6476* (2013.01); *H05B 6/686* (2013.01); *Y02B 40/143* (2013.01)

(58) Field of Classification Search
CPC ........ H05B 6/68; H05B 6/6476; H05B 6/686; H05B 6/645; H05B 6/642; Y02B 40/143
See application file for complete search history.

(56) References Cited

U.S. PATENT DOCUMENTS

| | | | |
|---|---|---|---|
| 5,961,871 A | 10/1999 | Bible et al. | |
| 2004/0004074 A1* | 1/2004 | Torngren | H05B 6/686 |
| | | | 219/678 |
| 2012/0067872 A1 | 3/2012 | Libman et al. | |
| 2012/0097667 A1* | 4/2012 | Niklasson | H05B 6/686 |
| | | | 219/702 |
| 2015/0070029 A1 | 3/2015 | Libman et al. | |
| 2017/0290105 A1* | 10/2017 | Gambato | H05B 6/72 |

(Continued)

FOREIGN PATENT DOCUMENTS

WO     2015028839 A1     3/2015

OTHER PUBLICATIONS

International Search Report and Written Opinion of PCT/US2017/062221 dated Mar. 20, 2018, all enclosed pages cited.

*Primary Examiner* — Donnell A Long
(74) *Attorney, Agent, or Firm* — Burr & Forman, LLP (57) ABSTRACT

An oven includes a cooking chamber configured to receive a food product and an RF heating system configured to provide RF energy into the cooking chamber using solid state electronic components. The solid state electronic components include power amplifier electronics configured to provide a signal into the cooking chamber via a launcher assembly operably coupled to the cooking chamber via a waveguide assembly. An isolation assembly is provided between the launcher assembly and the power amplifier electronics. The power amplifier electronics are controlled at least in part based on an efficiency parameter determined from a forward power value and a reflected power value that are each measured after the isolation assembly.

18 Claims, 6 Drawing Sheets

(56) References Cited

U.S. PATENT DOCUMENTS

2018/0146518 A1* 5/2018 Ma .................... H05B 6/664
2019/0297690 A1* 9/2019 Einzinger .............. H05B 6/70
2019/0313487 A1* 10/2019 Roumpedaki .......... H05B 6/686

* cited by examiner

FIG. 6

APPARATUS AND SYSTEM FOR FAULT PROTECTION OF POWER AMPLIFIER IN SOLID STATE RF OVEN ELECTRONICS

CROSS REFERENCE TO RELATED APPLICATIONS

This application claims priority to U.S. application No. 62/427,924 filed Nov. 30, 2016, the entire contents of which are hereby incorporated by reference it its entirety.

TECHNICAL FIELD

Example embodiments generally relate to ovens and, more particularly, relate to an oven that uses radio frequency (RF) heating provided by solid state electronic components and the protection of those components.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

In some cases, microwave cooking may be faster than convection or other types of cooking. Thus, microwave cooking may be employed to speed up the cooking process. However, a microwave typically cannot be used to cook some foods and also cannot brown foods. Given that browning may add certain desirable characteristics in relation to taste and appearance, it may be necessary to employ another cooking method in addition to microwave cooking in order to achieve browning. In some cases, the application of heat for purposes of browning may involve the use of heated airflow provided within the oven cavity to deliver heat to a surface of the food product.

However, even by employing a combination of microwave and airflow, the limitations of conventional microwave cooking relative to penetration of the food product may still render the combination less than ideal. Moreover, a typical microwave is somewhat indiscriminate or uncontrollable in the way it applies energy to the food product. Thus, it may be desirable to provide further improvements to the ability of an operator to achieve a superior cooking result. However, providing an oven with improved capabilities relative to cooking food with a combination of controllable RF energy and convection energy may require the structures and operations of the oven to be substantially redesigned or reconsidered.

BRIEF SUMMARY OF SOME EXAMPLES

Some example embodiments may therefore provide improved structures and/or systems for applying heat to the food product in the oven. Moreover, such improvements may necessitate new arrangements for supporting or operating such structures or systems. In particular, for an oven that uses solid state components, instead of a magnetron, to generate RF energy, the protection of the solid state components may be important. Example embodiments may provide improved capabilities for providing such protection.

In an example embodiment, an oven is provided. The oven may include a cooking chamber configured to receive a food product and an RF heating system configured to provide RF energy into the cooking chamber using solid state electronic components. The solid state electronic components may include power amplifier electronics configured to provide a signal into the cooking chamber via a launcher assembly operably coupled to the cooking chamber via a waveguide assembly. An isolation assembly may be provided between the launcher assembly and the power amplifier electronics. The power amplifier electronics may be controlled at least in part based on an efficiency parameter determined from a forward power value and a reflected power value that are each measured after the isolation assembly.

In an example embodiment, a protection system for an oven is provided. The oven may include a cooking chamber configured to receive a food product and an RF heating system configured to provide RF energy into the cooking chamber using solid state electronic components. The solid state electronic components may include power amplifier electronics configured to provide a signal into the cooking chamber via a launcher assembly operably coupled to the cooking chamber via a waveguide assembly. The protection system may include an isolation assembly disposed between the launcher assembly and the power amplifier electronics, and control electronics configured to control operation of the power amplifier electronics at least in part based on an efficiency parameter determined from a forward power value and a reflected power value that are each measured after the isolation assembly.

Some example embodiments may improve the cooking performance or operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, the oven may cook food relatively quickly and uniformly, based on the application of RF energy under the instruction of control electronics that are configured to employ protective strategies and structures to prevent damage to the control electronics.

Figure 1:
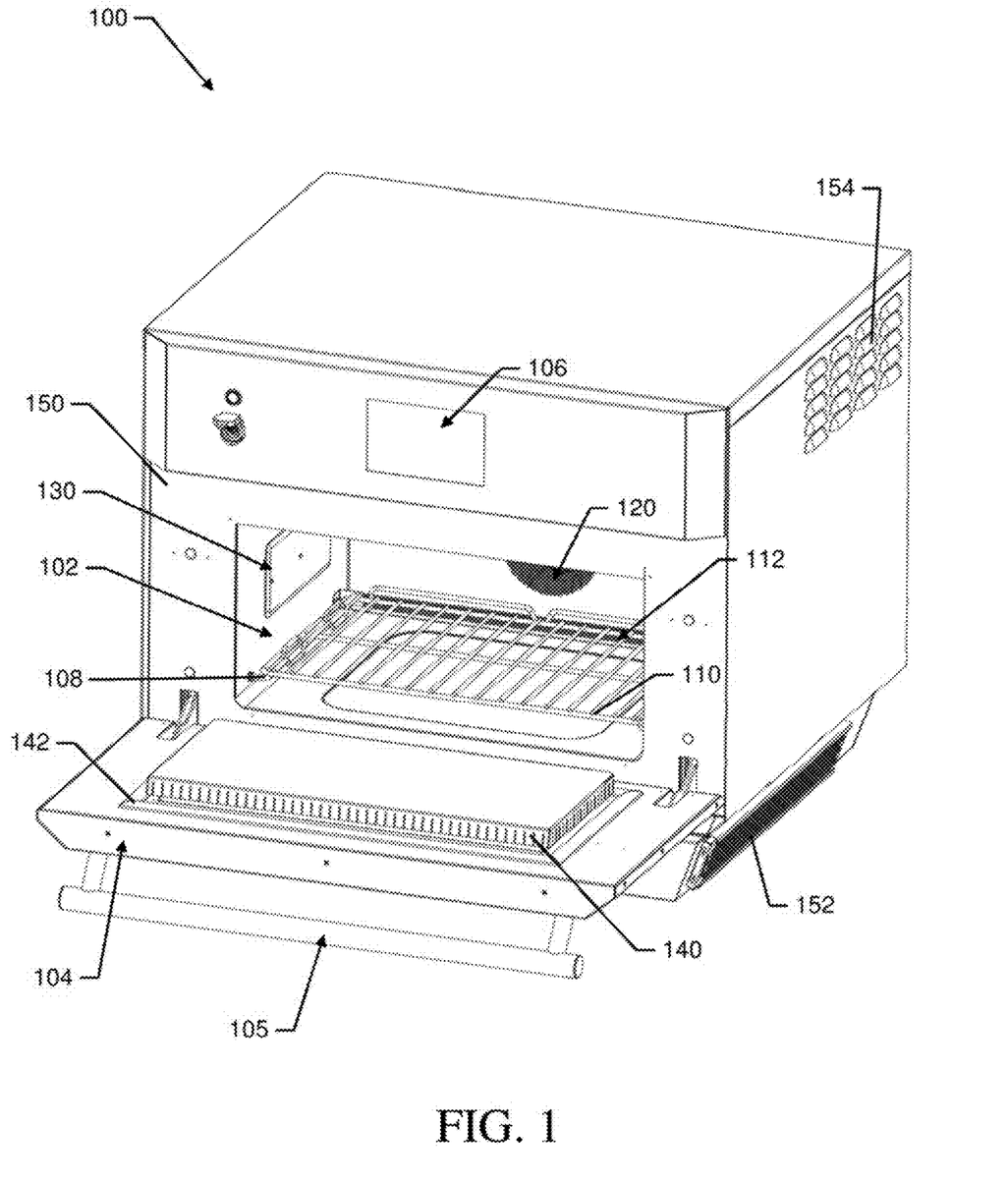
FIG. 1 illustrates a perspective view of an oven capable of employing at least two energy sources according to an example embodiment.

FIG. 1 illustrates a perspective view of an oven 1 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

In an example embodiment, food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang 158 that blocks any air path between inlet and outlet. As such, air drawn into the inlet array 152 can reliably be expected to be air at ambient room temperature, and not recycled, expelled cooling air.

Figure 2:
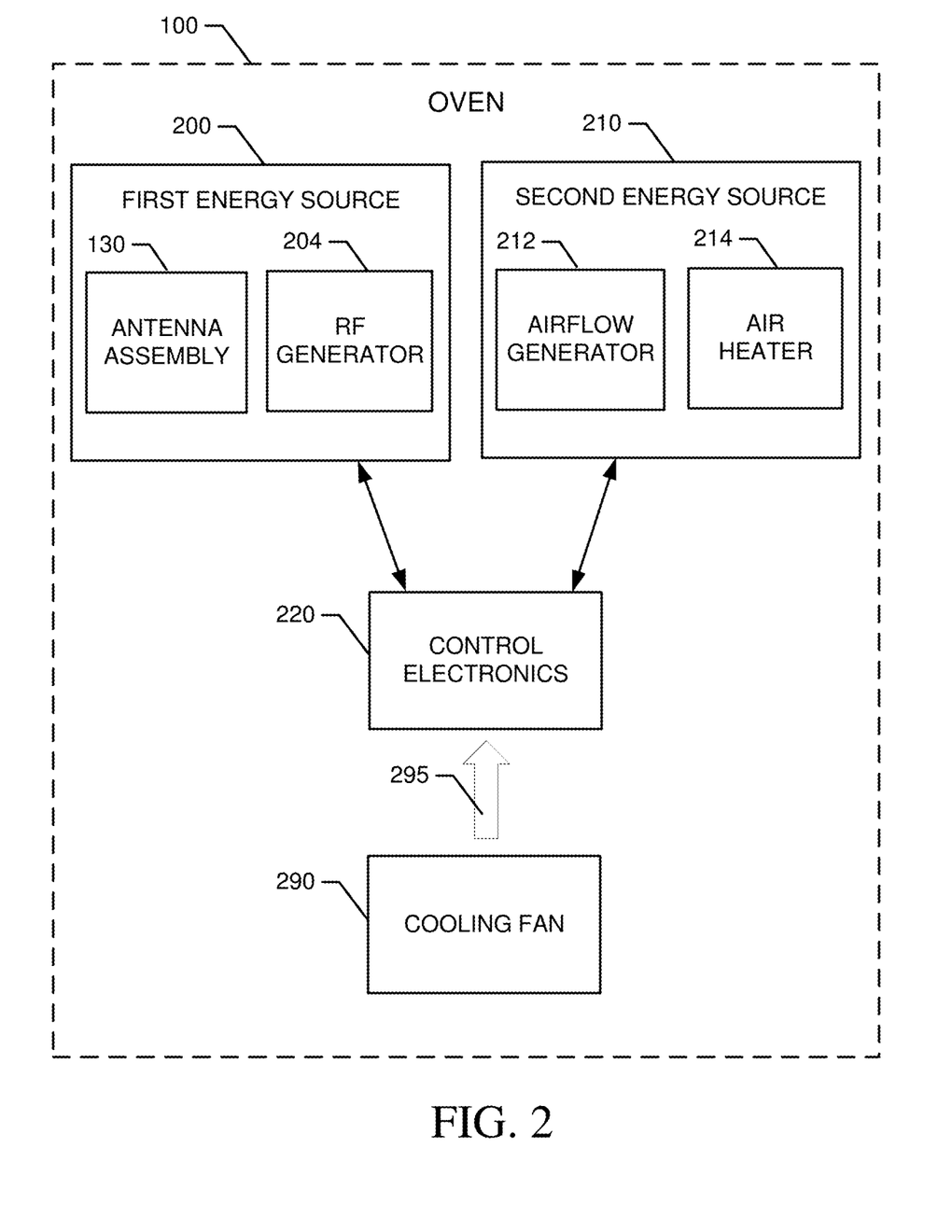
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments. Moreover, some example embodiments could be practiced in the context of an oven that includes only a single energy source (e.g., the second energy source 210). As such, example embodiments could be practiced on otherwise conventional ovens that apply heat using, for example, gas or electric power for heating.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from the ISM bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
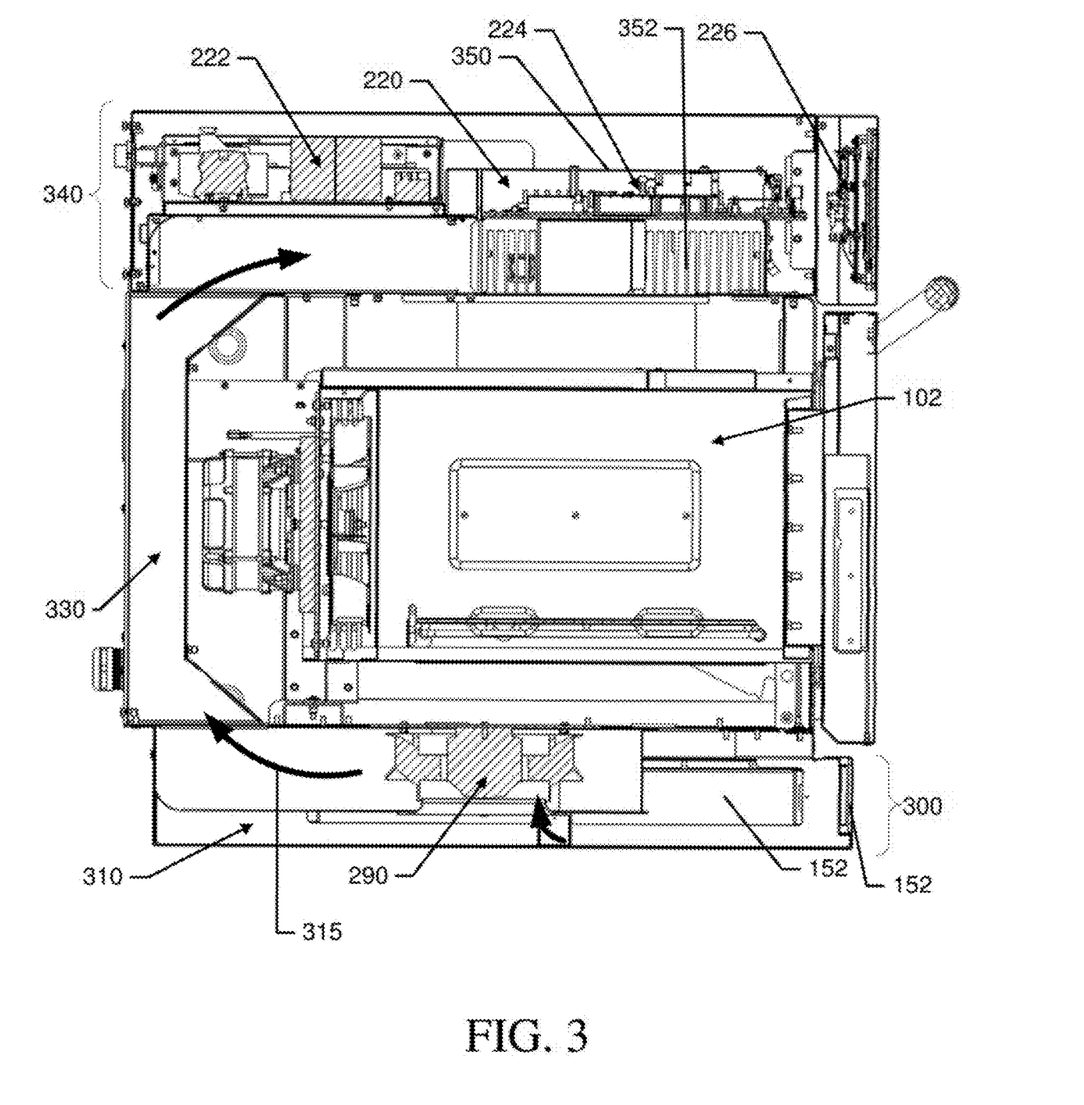
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
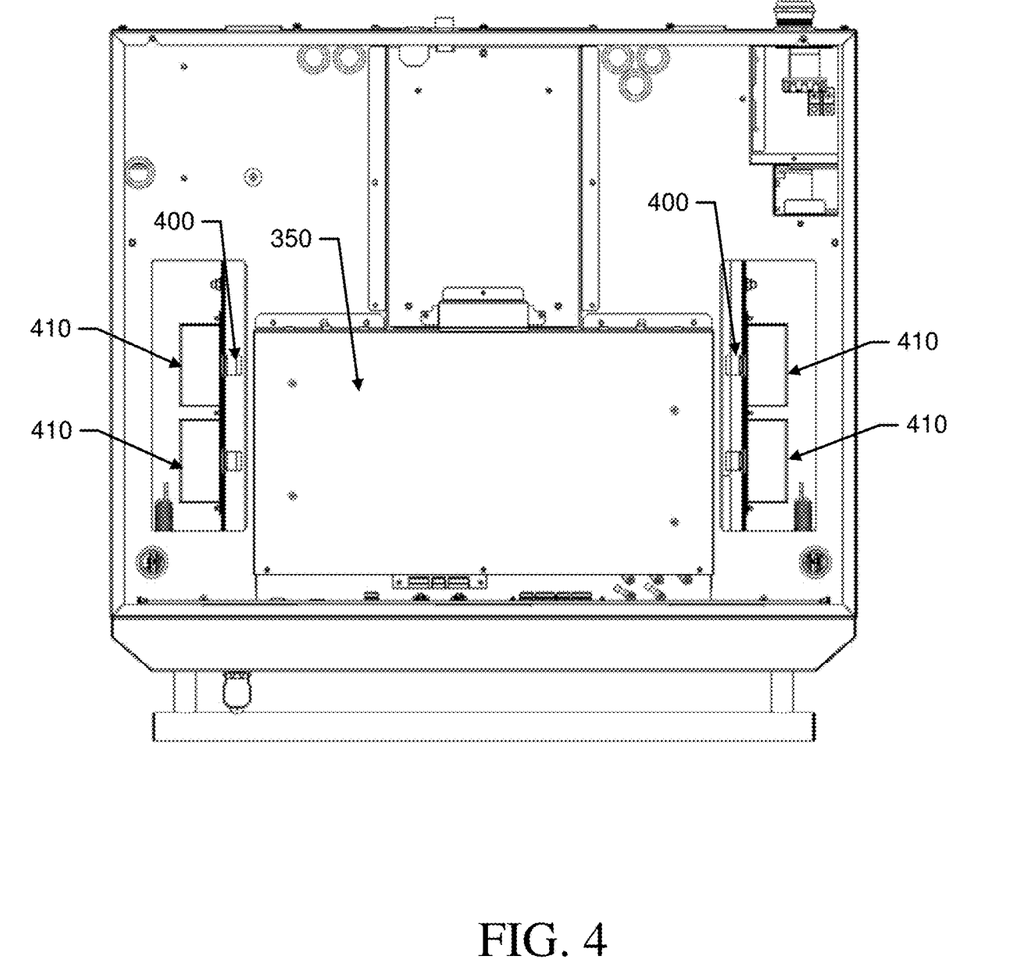
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$), divided by the forward power ($P_{fwd}$). As such, for example, the power inserted into the cooking chamber 102 (i.e., the forward power) may be measured along with the reflected power to determine the amount of power that has been absorbed in the food product (or workload) inserted in the cooking chamber 102. The efficiency may then be calculated as: Efficiency (eff)=$(P_{fwd}-P_{refl})/P_{fwd}$.

As can be appreciated from the description above, the measurement of the efficiency of the delivery of RF energy to the food product may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency. However, if measurement of the specific parameters involved in measuring efficiency are inaccurate, then the value of the efficiency measurement may be compromised. Thus, it is desirable to use accurate measurements. Moreover, if accurate measurements can be achieved for determining efficiency, such accurate measurements may also be useful, either alone or in combination with other parameter measurements, for making safety checks on vital components, or for protecting vital components of the oven 100. To achieve accurate measurement and protective functionality, some example embodiments may employ a protection system that is defined at least in part by a power isolation and fault detection system according to an example embodiment.

Figure 5:
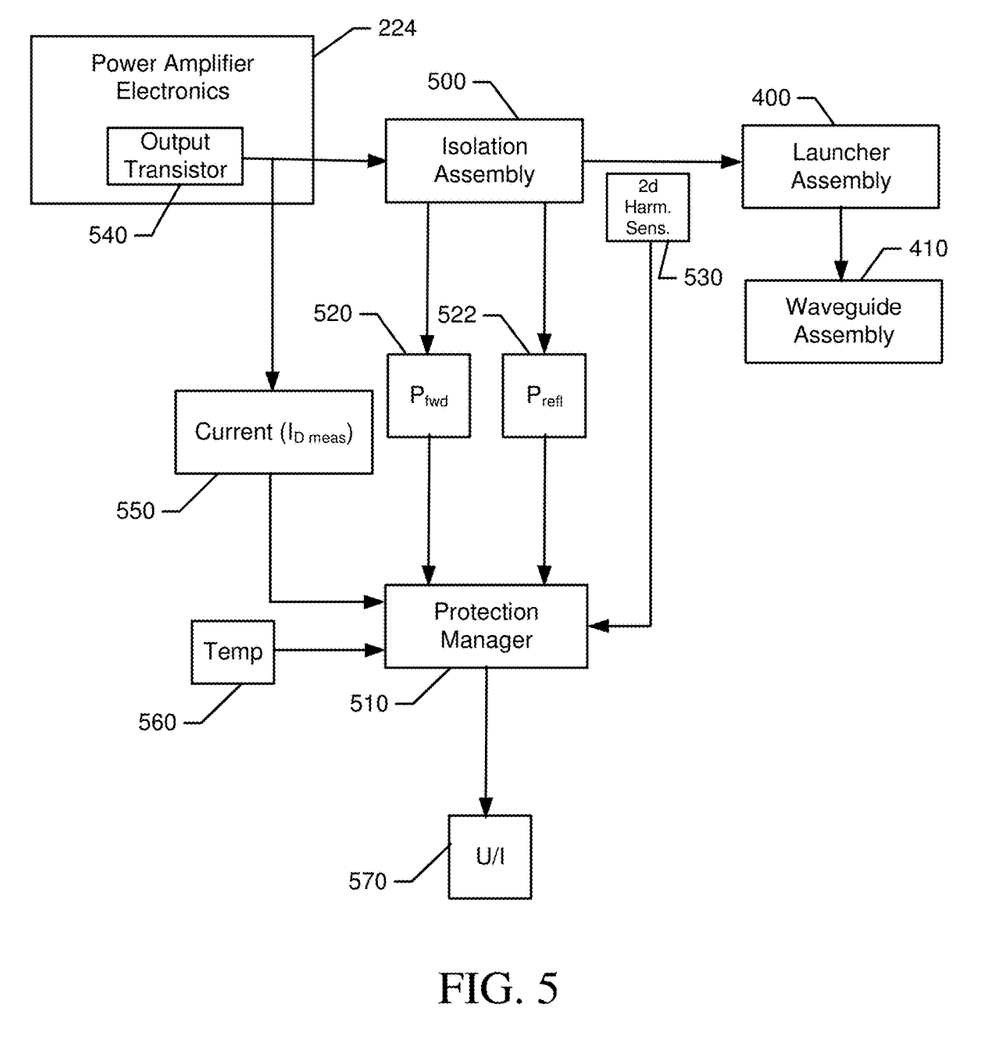
FIG. 5 is a block diagram of a protection system of an oven in accordance with an example embodiment.

FIG. 5 is a block diagram of the protection system of the oven 100 in accordance with an example embodiment. In this regard, FIG. 5 illustrates a protection system that includes an isolation assembly 500 and specific protective components of the control electronics 220 and their corresponding context within an example embodiment. In particular, a microprocessor or other circuitry of the control electronics 220 may be configured as a protection manager 510. The isolation assembly 500 and the protection manager 510 may work together to provide protective functions, troubleshooting assistance and calibration functionality for the oven 100.

As shown in FIG. 5, the isolation assembly 500 is disposed between the power amplifier electronics 224 and the launcher assembly 400. Thus, the isolation assembly 500 can provide isolation between the circuitry of the power amplifier and the launcher assembly 400 and the waveguide assembly 410. Accordingly, the isolation assembly 500 may enable measurement of a forward power value 520 and a reflected power value 522 that is accurate. In an example embodiment, the isolation assembly 500 may be embodied as a circulator (e.g., a ferrite or non-ferrite circulator). In some cases, the circulator may be a three port circulator and the measurements for the forward power value 520 and the reflected power value 522 may each be taken on the launcher assembly 400 side of the circulator. In some embodiments, a sensor 530 may also be provided on the same output line to the launcher assembly 400 to detect a second harmonic frequency for purposes of detecting arcing in the cooking chamber 102. The sensor 530 may provide an input to the protection manager 510 and, responsive to detecting the second harmonic frequency at a level indicative of arcing in the cooking chamber 102, the protection manager 510 may implement a protective function (e.g., shutting down RF energy application in the cooking chamber 102).

In some example embodiments, a current sensor may be operably coupled to the last transistor (i.e., the output transistor 540) of the power amplifier electronics 224 to enable measurement of DC current 550 (e.g., supply current) drawn from the power amplifier. The DC current 550 that is measured may also be provided to the protection manager 510 for consideration relative to the implementation of protective functions. In an example embodiment, a temperature input 560 may also be provided to the protection manager 510 for consideration relative to the implementation of protective functions. In an example embodiment, the temperature input 560 may include one or more of a temperature of the heat sinks 352 (individually or collectively), an air temperature in a portion of the second air circulation system (e.g., in the attic region 340), or a specific temperature proximate to one or more components of the control electronics 220 or specifically of the power amplifier electronics 224 (e.g., the microprocessor of the protection manager).

In some example embodiments, the DC current 550 may be used for remote diagnostics. For example, the DC current 550 may be compared to one or more diagnostic values to determine an operational status of the circulator. For example, if the DC current 550 is too high, too low, or not present, various faulty components may be identified or possibly identified for troubleshooting purposes. The DC current 550 may also be measured when a dummy load (or calibration load such as a predefined amount of water) is placed in the cooking chamber 102. In such a scenario, the DC current 550 may be compared to one or more calibration values to determine a calibration status of the power amplifier electronics 224. Calibration adjustments could be made to various power amplifier electronics 224 components in order achieve desired calibration values to thereby calibrate the power amplifier electronics 224. The adjustments may be made automatically or based on remote instructions in various example embodiments. Thus, the DC current 550 can be used to detect faulty components and for self-calibration.

As shown in FIG. 5, the protection manager 510 may also be operably coupled to a user interface 570 (e.g., associated with the interface panel 106). The user interface 570 may be used to provide a notification or alert to the user (e.g., visually and/or audibly) as a protective function and/or to explain a protective function taken or provide notice that the protective function has been initiated.

Figure 6:
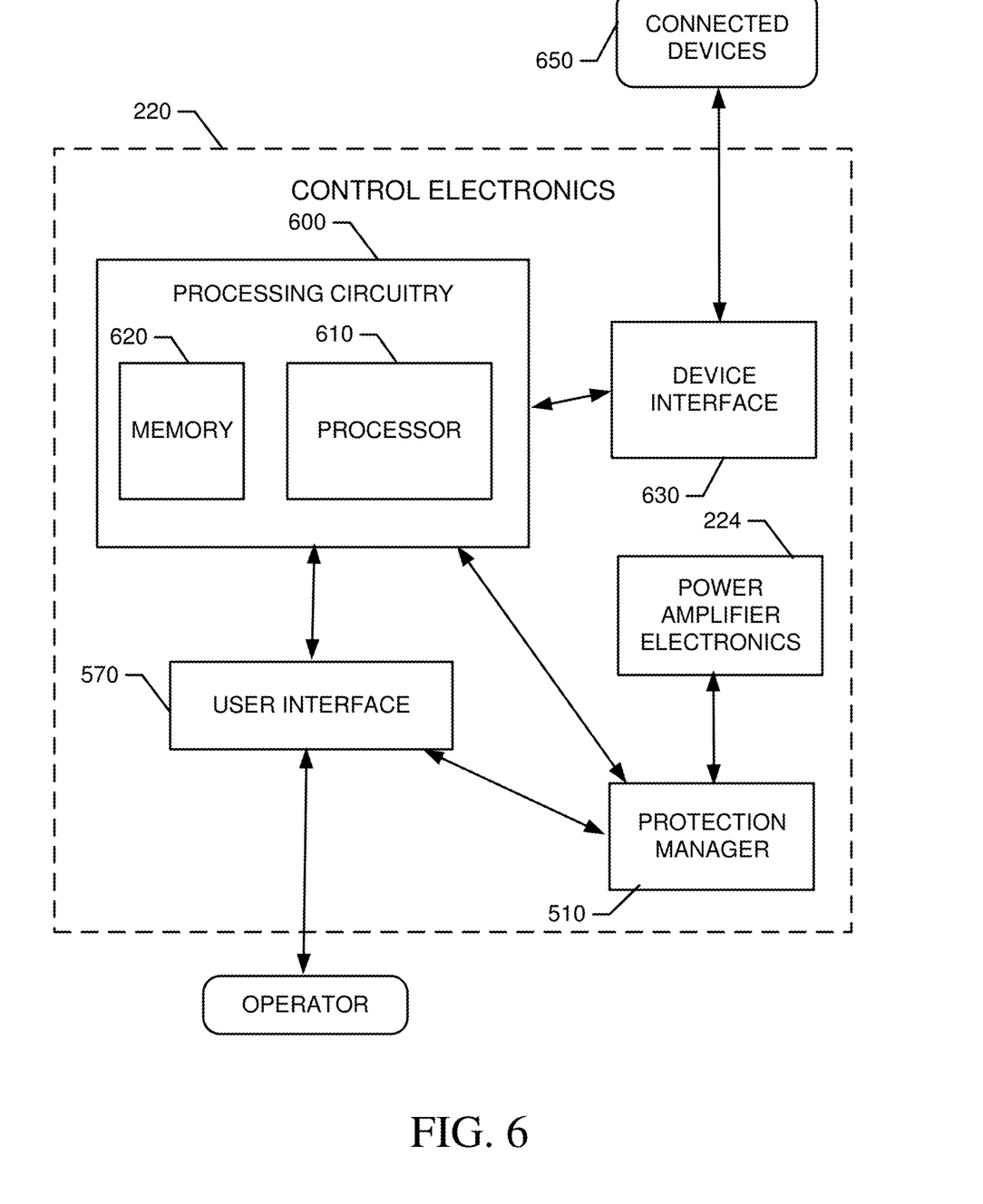
FIG. 6 is a block diagram of control electronics for providing the electronic circuitry for instantiation of the protection system in accordance with an example embodiment.

FIG. 6 is a block diagram of control electronics 220 for providing the electronic circuitry for instantiation of the protection system in accordance with an example embodiment. In some embodiments, the control electronics 220 may include or otherwise be in communication with processing circuitry 600 that is configurable to perform actions in accordance with example embodiments described herein. As such, for example, the functions attributable to the control electronics 220 may be carried out by the processing circuitry 600.

The processing circuitry 600 may be configured to perform data processing, control function execution and/or other processing and management services according to an example embodiment of the present invention. In some embodiments, the processing circuitry 600 may be embodied as a chip or chip set. In other words, the processing circuitry 600 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 600 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 600 may include one or more instances of each of a processor 610 and memory 620 that may be in communication with or otherwise control a device interface 630 and the user interface 570. As such, the processing circuitry 600 may be embodied as a circuit chip (e.g., an integrated circuit chip) configured (e.g., with hardware, software or a combination of hardware and software) to perform operations described herein. However, in some embodiments, the processing circuitry 600 may be embodied as a portion of an on-board computer.

The user interface 570 (which may be embodied as, include, or be a portion of the interface panel 106) may be in communication with the processing circuitry 600 to receive an indication of a user input at the user interface 570 and/or to provide an audible, visual, mechanical or other output to the user (or operator). As such, the user interface 570 may include, for example, a display (e.g., a touch screen such as the interface panel 106), one or more hard or soft buttons or keys, and/or other input/output mechanisms.

The device interface 630 may include one or more interface mechanisms for enabling communication with connected devices 650 such as, for example, other components of the oven 100, sensors of a sensor network of the oven 100, removable memory devices, wireless or wired network communication devices, and/or the like. In some cases, the device interface 630 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 630 may receive input at least from a temperature sensor that measures the temperatures described above, or receives input from any of the other parameters described above, in order to communicate such parameters to the protection manager 510. Alternatively or additionally, the device interface 630 may provide interface mechanisms for any devices capable of wired or wireless communication with the processing circuitry 600. In still other alternatives, the device interface 630 may provide connections and/or interface mechanisms to enable the processing circuitry 600 to control the various components of the oven 100.

In an exemplary embodiment, the memory 620 may include one or more non-transitory memory devices such as, for example, volatile and/or non-volatile memory that may be either fixed or removable. The memory 620 may be configured to store information, data, cooking signatures, programs, recipes, applications, instructions or the like for enabling the control electronics 220 to carry out various functions in accordance with example embodiments of the present invention. For example, the memory 620 could be configured to buffer input data for processing by the processor 610. Additionally or alternatively, the memory 620 could be configured to store instructions for execution by the processor 610. As yet another alternative, the memory 620 may include one or more databases that may store a variety of data sets responsive to input from the sensor network, or responsive to programming of any of various cooking programs. Among the contents of the memory 620, applications may be stored for execution by the processor 610 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 610 and stored in memory 620 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 620 may store applications for defining responses to stimuli including the generation of protective actions and/or notification functions.

The processor 610 may be embodied in a number of different ways. For example, the processor 610 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 610 may be configured to execute instructions stored in the memory 620 or otherwise accessible to the processor 610. As such, whether configured by hardware or by a combination of hardware and software, the processor 610 may represent an entity (e.g., physically embodied in circuitry—such as in the form of processing circuitry 600) capable of performing operations according to example embodiments of the present invention while configured accordingly. Thus, for example, when any instance of the processor 610 is embodied as an ASIC, FPGA or the like, the processor 610 may be specifically configured hardware for conducting the operations described herein. Alternatively, as another example, when the processor 610 is embodied as one or more executors of software instructions, the instructions may specifically configure the processor 610 to perform the operations described herein.

In an example embodiment, the processor 610 (or the processing circuitry 600) may be embodied as, include or otherwise control the control electronics 220 and/or the protection manager 510. As such, in some embodiments, the processor 510 (or the processing circuitry 500) may be said to cause each of the operations described in connection with the control electronics 220 and/or the protection manager 510 by directing the control electronics 220 and/or the protection manager 510, respectively, to undertake the corresponding functionalities responsive to execution of instructions or algorithms configuring the processor 610 (or processing circuitry 600) accordingly. As an example, the control electronics 220 (or more specifically, the protection manager 510) may be configured to control the responses to various stimuli associated with detecting the parameters and/or values discussed above in reference to FIG. 5. Moreover, the control electronics 220 may be configured to determine efficiency parameters and take protective actions based on the efficiency parameters, or based on individual ones of the values, measurements and/or parameters that are determined by or received at the control electronics 220 (or the protection manager 510). In some cases, a separate instance of a processor (or processors) and memory may be associated with different parts of the control electronics 220 (e.g., including separate processors for the control of the power amplifier electronics 224 and the protection manager 224 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions as described herein. Finally, the control electronics 220 may execute instructions for calibration and/or fault analysis.

Accordingly, for example, the control electronics 220 (or more specifically, the protection manager 510 may be configured to act locally to protect the power amplifier electronics 224 via stopping RF application to the cooking chamber 102, via making adjustments to components to provide calibrated outputs, and/or via alerting the user when various abnormal or correctable situations are detected.

In some embodiments, efficiency calculations may be made periodically throughout the cooking process as part of a learning process. In this regard, the control electronics 220 may be configured to extrapolate, calculate or otherwise determine the amount of energy to be directed into food product (i.e., forward power value 520), and the amount of energy reflected back from the cooking chamber 102 (i.e., the reflected power value 522) so that an accurate estimate of the absorbed power (or energy) can be estimated, and the efficiency parameter can be determined. The control electronics 220 may then control operation of the RF generator 204 and/or the antenna assembly 130 based on the measured efficiency as part of a calibration or cooking process. Thus, for example, if a learning process is performed during cooking, the measured efficiency may be expected to be at least above a threshold value (e.g., 40%) whenever there is a food product or load in the cooking chamber 102. If efficiency is below the threshold value, the protection manager 510 may communicate with the user interface 570 to let the user know to check the cooking chamber 102 to make sure that there is a load therein. Discrete efficiency measurements may be made at any desirable interval (e.g., every 100 msec) to perform the protective or alert functions described herein. If reflected power is very high, the power amplifier electronics 224 may be shutdown. If certain temperatures of components (e.g., one or both of the heat sinks 352, the processor 610, or air temperatures) are too high, an alarm may be provided through the user interface 570 and/or the power amplifier electronics 224 may be shutdown. Other protective actions are also possible.

In an example embodiment, an oven may be provided. The oven may include a cooking chamber configured to receive a food product and an RF heating system configured to provide RF energy into the cooking chamber using solid state electronic components. The solid state electronic components may include power amplifier electronics configured to provide a signal into the cooking chamber via a launcher assembly operably coupled to the cooking chamber via a waveguide assembly. An isolation assembly may be provided between the launcher assembly and the power amplifier electronics. The power amplifier electronics may be controlled at least in part based on an efficiency parameter determined from a forward power value and a reflected power value that are each measured after the isolation assembly.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the isolation assembly may be embodied as a circulator. In an example embodiment, the oven may further include control electronics that define a protection manager. The protection manager may be configured to receive the forward power value and the reflected power value to determine the efficiency parameter. The efficiency parameter may be compared to a threshold efficiency and a protective function is initiated based on the comparison. In an example embodiment, the isolation assembly may be operably coupled to an output transistor of the power amplifier electronics. In such an example, a supply current to the launcher assembly may be measured at an output of the output transistor. In some embodiments, the supply current may be compared to one or more diagnostic values to determine an operational status of the isolation assembly. Alternatively or additionally, the supply current is compared to one or more calibration values to determine a calibration status of the power amplifier electronics. In an example embodiment, the protection manager may be configured to initiate a shutdown of application of RF energy as the protective function in response to reflected power being greater than a predefined limit. In some cases, the protection manager may be configured to initiate a user alert as the protective function in response to the efficiency parameter being less than the threshold efficiency. In an example embodiment, the protection manager may be configured to receive one or more temperature measurements, and wherein the protective function may further be initiated based on the one or more temperature measurements. In such an example, the temperature measurements may include measurement of heat sink temperature, air temperature of a cooling system for cooling the control electronics proximate to a processor of the control electronics.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a food product;
a radio frequency (RF) heating system configured to provide RF energy into the cooking chamber using solid state electronic components; and
control electronics defining a protection manager,
wherein the solid state electronic components include power amplifier electronics configured to provide a signal into the cooking chamber via a launcher assembly operably coupled to the cooking chamber via a waveguide assembly,
wherein an isolation assembly is provided between the launcher assembly and the power amplifier electronics, and
wherein the power amplifier electronics are controlled at least in part based on an efficiency parameter determined from a forward power value and a reflected power value that are each measured after the isolation assembly,
wherein the protection manager is configured to receive the forward power value and the reflected power value to determine the efficiency parameter, and
wherein the isolation assembly is operably coupled to an output transistor of the power amplifier electronics, and wherein a supply current to the launcher assembly is measured at an output of the output transistor.

2. The oven of claim 1, wherein the isolation assembly comprises a circulator.

3. The oven of claim 1, wherein the efficiency parameter is compared to a threshold efficiency and a protective function is initiated based on the comparison.

4. The oven of claim 3, wherein the protection manager is configured to initiate a shutdown of application of RF energy as the protective function in response to reflected power being greater than a predefined limit.

5. The oven of claim 3, wherein the protection manager is configured to initiate a user alert as the protective function in response to the efficiency parameter being less than the threshold efficiency.

6. The oven of claim 3, wherein the protection manager is configured to receive one or more temperature measurements, and wherein the protective function may further be initiated based on the one or more temperature measurements.

7. The oven of claim 6, wherein the temperature measurements include measurement of heat sink temperature, air temperature of a cooling system for cooling the control electronics proximate to a processor of the control electronics.

8. The oven of claim 1, wherein the supply current is compared to one or more diagnostic values to determine an operational status of the isolation assembly.

9. The oven of claim 1, wherein the supply current is compared to one or more calibration values to determine a calibration status of the power amplifier electronics.

10. A protection system for an oven comprising a cooking chamber configured to receive a food product and a radio frequency (RF) heating system configured to provide RF energy into the cooking chamber using solid state electronic components, the solid state electronic components include power amplifier electronics configured to provide a signal into the cooking chamber via a launcher assembly operably coupled to the cooking chamber via a waveguide assembly, the protection system comprising:
an isolation assembly disposed between the launcher assembly and the power amplifier electronics, and
control electronics configured to control operation of the power amplifier electronics at least in part based on an efficiency parameter determined from a forward power value and a reflected power value that are each measured after the isolation assembly,
wherein the control electronics define a protection manager configured to receive the forward power value and the reflected power value to determine the efficiency parameter, and
wherein the isolation assembly is operably coupled to an output transistor of the power amplifier electronics, and wherein a supply current to the launcher assembly is measured at an output of the output transistor.

11. The protection system of claim 10, wherein the isolation assembly comprises a circulator.

12. The protection system of claim 10, wherein the efficiency parameter is compared to a threshold efficiency and a protective function is initiated based on the comparison.

13. The protection system of claim 12, wherein the protection manager is configured to initiate a shutdown of application of RF energy as the protective function in response to reflected power being greater than a predefined limit.

14. The protection system of claim 12, wherein the protection manager is configured to initiate a user alert as the protective function in response to the efficiency parameter being less than the threshold efficiency.

15. The protection system of claim 12, wherein the protection manager is configured to receive one or more temperature measurements, and wherein the protective function may further be initiated based on the one or more temperature measurements.

16. The protection system of claim 15, wherein the temperature measurements include measurement of heat sink temperature and air temperature of a cooling system for cooling the control electronics proximate to a processor of the control electronics.

17. The protection system of claim 10, wherein the supply current is compared to one or more diagnostic values to determine an operational status of the isolation assembly.

18. The protection system of claim 10, wherein the supply current is compared to one or more calibration values to determine a calibration status of the power amplifier electronics.

* * * * *